United States Patent
Pannell

(10) Patent No.: US 8,085,658 B1
(45) Date of Patent: *Dec. 27, 2011

(54) SYSTEM AND METHOD OF CROSS-CHIP FLOW CONTROL

(75) Inventor: Donald Pannell, Cupertino, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,801

(22) Filed: Aug. 20, 2010

Related U.S. Application Data

(63) Continuation of application No. 11/768,613, filed on Jun. 26, 2007, now Pat. No. 7,782,770.

(60) Provisional application No. 60/817,923, filed on Jun. 30, 2006.

(51) Int. Cl.
*H04L 1/00* (2006.01)

(52) U.S. Cl. .......... 370/229; 370/252; 370/360; 710/36; 710/52

(58) Field of Classification Search .......... None
See application file for complete search history.

(56) References Cited

U.S. PATENT DOCUMENTS

| | | | |
|---|---|---|---|
| 6,256,315 B1 | 7/2001 | Barbas et al. | |
| 7,065,582 B1 | 6/2006 | Dwork et al. | |
| 7,085,846 B2 | 8/2006 | Jenne et al. | |
| 7,161,906 B2 * | 1/2007 | Dell et al. | 370/231 |
| 7,209,440 B1 * | 4/2007 | Walsh et al. | 370/230 |
| 7,680,053 B1 | 3/2010 | Pannell et al. | |
| 7,706,363 B1 | 4/2010 | Daniel et al. | |
| 7,782,770 B1 * | 8/2010 | Pannell | 370/229 |
| 2002/0089978 A1 * | 7/2002 | Wang et al. | 370/389 |
| 2002/0141427 A1 | 10/2002 | McAlpine | |
| 2004/0120252 A1 | 6/2004 | Bowen et al. | |
| 2007/0041373 A1 | 2/2007 | Lor et al. | |

* cited by examiner

*Primary Examiner* — Chi H. Pham
*Assistant Examiner* — Shick Hom

(57) ABSTRACT

A system and method of controlling data flow may take into account an egress port flow control configuration as well as an original ingress port flow control configuration. A queue controller may execute a flow control algorithm or a quality of service algorithm responsive to the flow control modes at either or both of the original ingress port and the egress port.

14 Claims, 3 Drawing Sheets

SYSTEM AND METHOD OF CROSS-CHIP FLOW CONTROL

CROSS-REFERENCE TO RELATED APPLICATIONS

The present application is a continuation of U.S. application Ser. No. 11/768,613, filed Jun. 26, 2007, now U.S. Pat. No. 7,782,770, which claims the benefit of U.S. provisional application Ser. No. 60/817,923, filed Jun. 30, 2006, entitled "CROSS CHIP FLOW CONTROL ENHANCEMENTS". The disclosures of both of these applications are incorporated herein by reference in their entirety.

BACKGROUND

1. Field of the Invention

Aspects of the present invention relate generally to flow control methodologies, and more particularly to a system and method of controlling data flow that take into account flow control modes at an original ingress port and an egress port.

2. Description of Related Art

Current switching technology generally relies upon a queue controller (QC), which manages data flow through a switch as a function of the mode in which a particular ingress port is operating. Typically, the QC bases the decision to transmit or to drop a particular data frame upon the mode at the ingress port receiving the frame. In some situations, for example, when "flow control" functionality is enabled on the ingress port, the QC will never drop a frame, but rather it will issue a "pause" command to the ingress port (temporarily to cease data flow when the port is in full duplex mode) or exert "backpressure" (to perform the same function when the port is in half duplex mode) where appropriate to ensure that the ingress port receives every data frame uninterrupted. Conversely, when flow control is disabled on the ingress port, the QC may decide to discard a particular frame if the egress queue is congested (i.e., the QC need not issue a request to the ingress port to pause or exert backpressure).

It has been recognized that the foregoing method can suffer deficiencies when some ports are configured with flow control enabled and some ports are configured with flow control disabled. Further, when a data frame is transmitted cross-chip in a multiple chip switching system, the QC typically employs the flow control mode at a local ingress port, rather than the original ingress port. This scenario can create problems, for example, when the original ingress port does not have flow control enabled because cross-chip communication generally is flow control enabled when at least one port in the switch is flow control enabled. As a consequence, a frame may be treated as flow controlled (as a function of the local ingress port's configuration) even though the original source port is not expecting flow control pause or backpressure.

Hence, it would be desirable to provide a method and system that effectively account for multiple port modes in a dynamic switching environment.

SUMMARY

Embodiments of the present invention overcome the above-mentioned and various other shortcomings of conventional technology, providing a system and method of controlling data flow that take into account an egress port flow control configuration as well as an original ingress port flow control configuration. A queue controller that considers flow control modes at both the egress port and the original ingress port may allow robust and flexible cross-chip data flow (i.e., across multiple switch devices).

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Introduction

It will be appreciated that the term "cross-chip" as used herein generally refers to data flow across multiple switch devices. In this context, exemplary switching hardware may incorporate or be implemented as an integrated circuit (IC) or other silicon-based structures, though references to "chip" are not intended to be so limited. Aspects of the invention may allow improved flow control functionality irrespective of the nature, physical characteristics, or material composition of any particular switching hardware.

Figure 1:
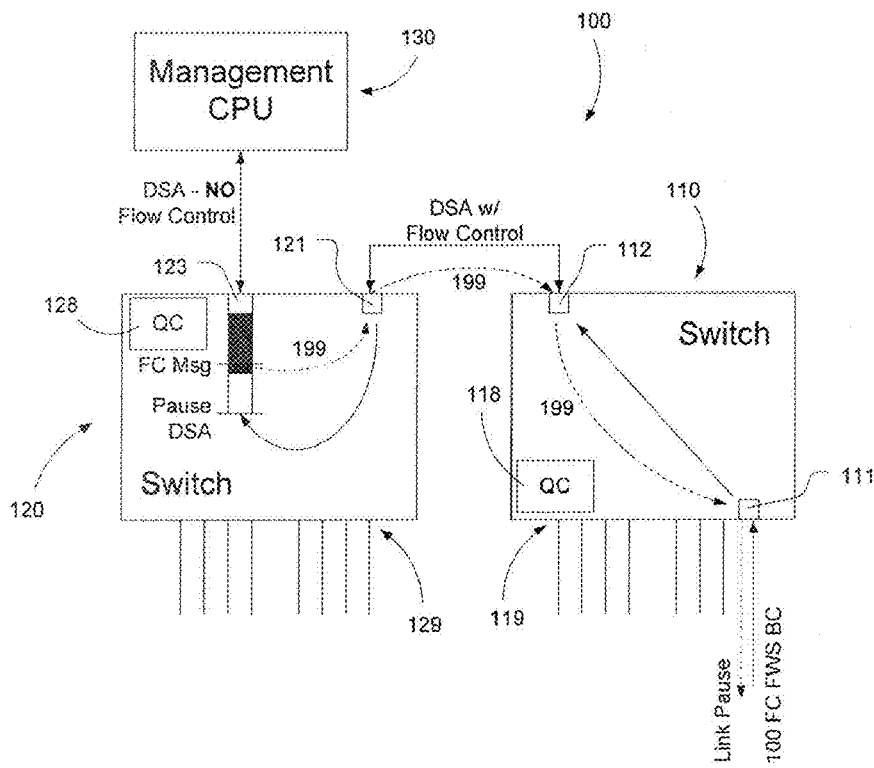
FIG. 1 is a simplified block diagram illustrating one embodiment of exemplary switching hardware and cross-chip data flow.
Figure 2:
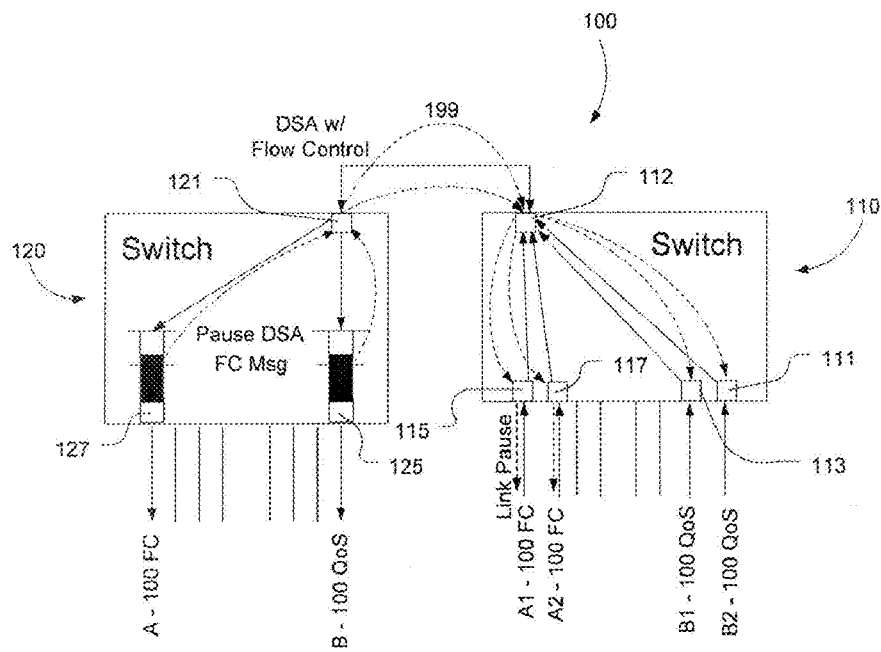
FIG. 2 is a simplified block diagram illustrating another embodiment of exemplary switching hardware and cross-chip data flow.

FIGS. 1 and 2 are simplified block diagrams illustrating embodiments of exemplary switching hardware and cross-chip data flow. FIGS. 1 and 2 depict managed switching systems that include two switch devices for simplicity; it will be appreciated that such systems may include any number of additional switch devices as necessary or desired for a particular application. Data flow in the drawing figures is represented by solid arrows, while pause or backpressure or cross-chip flow control messages are represented by dashed arrows.

The illustrated arrangements employ distributed switching architecture (DSA) tagged data frames; this DSA technology is proprietary to the assignee of the present disclosure. Additional information regarding DSA technology may be found in U.S. Pat. Nos. 7,706,363 and 7,680,053, the disclosures of which are incorporated herein by reference. While the present disclosure is not intended to be limited to transmission of DSA tagged frames, transmission of such frames may create a situation in which examining a flow control mode associated with an egress port may have utility as set forth below.

In the exemplary architecture, a managed switching system 100 generally includes switch devices 110, 120 and a management central processing unit (CPU) 130. Switch devices 110 and 120 comprise respective ports, noted generally by reference numerals 119 and 129 respectively, that are operative to facilitate data transmission as is generally known in the art. A local ingress port 111 may receive a frame of data and switch the frame to a local egress port 112. The term "local" in this context refers to the fact that ports 111 and 112 are associated with switch device 110; i.e., these ports are local with respect to switch device 110. A particular egress port may be selected in accordance with address data associated with the frame, for instance, with register settings at port 111, or a combination of these and other factors. In that regard, switch devices 110 and 120 may comprise a microprocessor or other logic component (not shown in the drawing figures) to facilitate appropriate communication of data frames within system 100 and downstream to a destination address. Each switch device 110, 120 may comprise a respective queue controller (QC) indicated at reference numerals 118 and 128 to manage ingress and egress data flows. Additionally or alternatively, QC processing may be executed at or in conjunction with CPU 130.

As noted above, the data frame may be transmitted to a local (with respect to switch device 120) ingress port 121 of switch device 120 via a DSA enabled line, for example, or via another appropriate data communication link. As indicated in FIG. 1, the cross-chip DSA line may have flow control enabled, and may be operative to transmit data at a desired rate, such as 10-200 megabits per second (Mbit), for example. In the exemplary embodiment, cross-chip DSA line may support data transfer rates of up to 1 gigabit per second (Gbit) or more.

For managed switching, data frames may be transmitted or mirrored to CPU 130, such as through an internal port 123. In operation, CPU 130 may control or otherwise influence transmission of data frames (via ports 129) in accordance with, inter alia, source and destination address data, flow control or quality of service (QoS) algorithms, and other factors affecting operation at ports 119 and 129 (such as policy rules, types of frames, and the like). As illustrated in FIG. 1, CPU 130 may be coupled to internal port 123 via a DSA enabled line with flow control disabled. While a CPU is not depicted in FIG. 2 for clarity, the FIG. 2 architecture may readily be modified to include a management CPU analogous to CPU 130.

The exemplary arrangement of FIG. 1 represents a common implementation for switching system 100. Flow control is typically enabled at all ports with the exception of internal port 123. Port 111 receives full wire speed (FWS) broadcast (BC) data frame traffic. In one embodiment, port 111 receives data at 100 Mbit, which may be selected to correspond to the rate of data communication between CPU 130 and internal port 123 (internal port 123 generally runs at 100 Mbit in the DSA Tag mode for many applications). Those of skill in the art will appreciate that port 111 may receive data at some other rate typically within a range of about 10 Mbit to 1 Gbit or more, for example; similarly, the rate at which data are transmitted through internal port 123 may also vary.

Where the original data frame (i.e., the frame received at port 111) was not tagged for DSA, but transmission through managed switching system 100 employs DSA, a frame tag may be modified to enable propagation through system 100; accordingly, the tag allowing proper flow through system 100 may be larger than the original frame tag (i.e., it may include additional data necessary or desirable for proper DSA transmission). In such situations, and particularly where the FWS line feeding port 111 and the connection between internal port 123 and CPU 130 are both operating at the same rate (e.g., 100 Mbit), data egressing internal port 123 cannot keep pace with data ingressing port 111 because the overall size of each frame has increased following receipt at port 111. As a consequence of adding bits (associated with the DSA Tag) to each data frame, more data per frame must egress internal port 123 per unit time than are received at port 111. Where the transmission rates at port 111 and internal port 123 are substantially equal, egress congestion at internal port 123 may fill a queue or buffer (represented by the vertical bar in FIG. 1); this will generally be true irrespective of the data rate and mode configuration of any additional port 129 to which the data frame will be mapped.

In some implementations, the egress queue may lengthen beyond a flow control threshold (labeled "FC Msg" in FIG. 1), triggering a cross-chip flow control message frame condition. As indicated by the dashed arrows labeled 199 in FIGS. 1 and 2, QC 128, either independently or in cooperation with CPU 130, may cause pause messages to be transmitted to port 111 as the internal port 123 is not able to maintain the FWS data rate. Where the flow control strategy only examines the flow control mode at a local ingress (or "source") port (in this case, port 121 which has flow control enabled as noted above) to decide how to transmit or otherwise to manipulate a frame, these cross-chip flow control messages will be generated even if flow control is disabled at internal port 123 as well as other ports 129 of switch 120 (and even if flow control is disabled at the original ingress port 111).

Responsive to feedback from the QC, port 111 may transmit pause messages to the source from which it is receiving data frames in order to allow CPU 130 to empty the egress queue for internal port 123 or to shorten the egress queue below the flow control threshold; this is represented by the dashed arrow labeled "Link Pause" in FIG. 1. If the source continues to transmit data at FWS (for example, if flow control is disabled at port 111), the egress queue at switch 120 may pass a second threshold (labeled "Pause DSA" in FIG. 1). At this point, data communication via the cross-chip DSA line may be disabled, and frames may be discarded even where port 111 is configured for flow control.

Turning now to FIG. 2, another exemplary situation is illustrated. Local ingress ports 115 and 117 in switch device 110 are configured with flow control enabled and are operative to receive data at 100 Mbit. Conversely, ports 111 and 113 in switch device 110 are configured for QoS transmission (and thus have flow control disabled) and also are operative to receive data at 100 Mbit. All other ports have flow control disabled. As indicated in FIG. 2, ports 115 and 117 are mapped to local egress port 127 in switch device 120, while ports 111 and 113 are mapped to local egress port 125 in switch device 120.

In the exemplary arrangement, port 112 on switch 110 sends frames to port 121 on switch device 120 at FWS, i.e., in accordance with the data rate supported by the cross-chip DSA line (as noted above, this is typically 1 Gbit or greater). This is an uncongested flow that should remain uncongested.

Ports 115 and 117 (mapped to port 127) ingress frames at FWS (in this case, 100 Mbit); as indicated in FIG. 2, port 127 has flow control enabled. Accordingly, this is a 2-to-1 congestion case where no data loss is expected when cross-chip flow control is enabled.

Conversely, ports 111 and 113 (mapped to port 125) ingress frames at FWS, and port 125 has flow control disabled. While ports 111 and 113 are both illustrated as operating at 100 Mbit, it will be appreciated that these ports may ingress data at different rates, e.g., port 111 may operate at a first data rate, while port 113 may operate at a second data rate. This is a 2-to-1 congestion case where QoS may be implemented in accordance with predefined QoS weights, for example, taking into consideration the respective data rate at ports 111 and 113, and other factors as is generally known in the art.

In the so-called "mixed mode" configuration of FIG. 2 where some ports are configured for flow control and some are configured for QoS, all sets of frames may nevertheless be transmitted substantially simultaneously between the two switch devices 110 and 120 using the same cross-chip DSA link.

In a typical configuration, when the flow control algorithm only examines the local ingress port's mode, either QoS may work correctly (when the cross-chip DSA link has flow control disabled) or flow control may work correctly (when the cross-chip DSA link has flow control enabled). In a mixed mode set-up, however, the cross-chip flow generally gets congested; i.e., flow control and QoS may not work correctly together because the local ingress port (in this case, port 121) generally cannot be configured to support both modes simultaneously.

As set forth below, however, both flow control and QoS flows may work correctly where the mode of the local egress port (e.g., ports 125 and 127) is considered. Even where the cross-chip DSA link (and therefore local ingress port 121) is configured with flow control enabled, for instance, when a particular data frame is mapped to QoS port 125 on switch device 120, the QC may select a non-flow control algorithm to facilitate QoS in accordance with the setting at port 125.

It will be appreciated that the exemplary FIG. 2 arrangement may also be affected by the increased size of the frame tag in situations where the original frame was not tagged for DSA transmission. As discussed above with reference to FIG. 1, where the original data frame was not tagged for DSA but transmission through managed switching system 100 employs DSA, additional data necessary or desirable for proper DSA transmission may be added to the tag, which in turn may increase egress time.

An exemplary method and system of cross-chip flow control may facilitate proper data transfer in each of the situations noted above.

In accordance with one embodiment, QC 128 at switch device 120 may employ the flow control mode of the original source or ingress port (in this case, ports 111, 113, 115, and 117) as opposed to the local source port (in this case, port 121) to enable flow control or to disable flow control as a frame moves from switch device 110 to switch device 120 through system 100; as set forth in more detail below, the flow control mode of the egress port is also employed. In operation, employing the original ingress port mode ensures that proper flow control will be executed even if, for example, data are mapped from port 111 (configured for QoS) on switch device 110 to port 127 (configured for flow control) on switch device 120. In this case, the frames will still be transmitted in accordance with a non-flow control algorithm because a flow control bit in the Forward DSA Tag from the original ingress port 111 is used, i.e., the mode at local ingress port 121 does not influence whether flow control is enabled. Accordingly, a non-flow control algorithm may be used even though the local ingress port 121 (i.e., the DSA port) has flow control enabled.

Exemplary Implementations

In accordance with one aspect of the invention, a QC may be implemented to take into account the flow control mode of the local egress port as well as that of the original ingress port. In some embodiments, a flow control algorithm will only be executed when both the original ingress port and the local egress port for a particular frame have flow control enabled. If the flow control algorithm is not being utilized on a given QC frame mapping, then a tail drop policy (non-flow control or QoS policy) may be implemented instead, i.e., neither pause nor backpressure will be asserted on the original source port due to this frame, even if the local ingress port has flow control enabled.

It will be appreciated that a frame egressing from multiple ports (e.g., in a multicast or broadcast situation) may potentially have separate algorithms applied to it, depending upon the particular egress port queue into which it is currently being mapped. Such a frame may be discarded (or not mapped) with respect to some egress queues while never getting discarded with respect to other egress queues. In the foregoing manner, the assertion and deassertion for flow control (pause and/or backpressure) may be influenced by flow control enabled egress ports, while QoS egress ports remain unaffected.

In one embodiment, ingress processing at the QC may be configured to ensure that cross-chip flow control messages are generated only if the original destination port vector (DPV) from ingress maps to egress ports that have flow control enabled and at least one of these ports is congested.

Additionally, as noted above, processing at the QC may be configured to examine the flow control mode at the original source or ingress port. In this context, an ingress port may be "original" only when the frame enters a non-DSA Tag port; alternatively, any port of a managed switching system 100 such as illustrated in FIGS. 1 and 2 that receives a data frame from a source external to the system 100 itself may be considered an "original" ingress port. Such original ingress ports may include hardware registers, for example, or other mechanisms for altering a frame tag or otherwise apprising the QC of the flow control mode at ingress.

It will be appreciated that the QC may employ separate thresholds for flow control and for QoS; accordingly, the QC may selectively determine when cross-chip flow control messages should be generated independent of any 'congested' threshold that may have utility for QoS processing on a frame-by-frame basis.

Those of skill in the art will appreciate that half duplex ports with bi-directional traffic may require increased cross-chip flow control delays in certain circumstances. In some instances, it may be desirable to add a "divide by 4" feature to the delay timer for such ports. In one exemplary embodiment, instead of each count delaying 2.048 microseconds (μsec), such a divide by 4 function provides a delay of 8.192 μsec. Power-on reset values for the delays (based upon speed of data transmission) may then be adjusted accordingly.

Another option is to modify a flow control DSA Tag to include a bit representing congestion. For example, a bit may be defined in the tag such that 1="congested" whereas 0="uncongested". When a receiving media access controller (MAC) receives a cross-chip flow control message frame with the congested bit set to indicate congestion, the receiving port may adjust the delay time by a predetermined factor (e.g., two, four, or some other appropriate scaling factor). In the foregoing manner, the rate for half duplex ports may be properly adjusted assuming that the ports are being fair (i.e., the bi-directional traffic rate is about 50% of a full duplex rate). In some implementations, a port may be considered congested if it is a half duplex port at which the last frame transmitted incremented the collision counter or if it is a full duplex port that is currently paused off, though other criteria may be employed to determine congestion.

Alternatively, the actual egress rate may be computed. In some sophisticated embodiments, the QC may take into account half duplex modes (with and without bi-directional traffic), and it may also take into account full duplex ports that are being slowed down by external Institute of Electrical & Electronics Engineers (IEEE) pause-based flow control (for example a 100 Mbit port being slowed down to an effective egress rate of a 10 Mbit port).

In operation, an 'effective rate' for the egress port may be transmitted, for example, in a flow control message frame; additionally or alternatively, a 'delay' duration may be transmitted. Identifying a particular delay duration allows the port to scale the delay up, for instance, based upon the number of cross-chip flow control message frames it had to generate in a given time period, or based upon other factors. This will allow the switching system dynamically to adjust, allowing flexible mapping strategies and accommodating mapping two ports to one, three ports to one, four ports to one, and so forth. The open loop nature of the switching system remains undisturbed.

As set forth above with reference to FIGS. 1 and 2, an exemplary cross-chip flow control strategy may employ a QC that utilizes the flow control mode at an egress port to determine whether to apply a flow control algorithm or a QoS algorithm. Further, the flow control (non-drop) algorithm implemented at the QC may also consider the mode of the egress or destination port. Where both the ingress port and the egress port need to be in flow control enabled mode before the flow control algorithm is applied, it is necessary to examine the mode at the "original" ingress port as set forth above; this is particularly true when the source of a frame is a DSA Tag enabled port.

Figure 3:
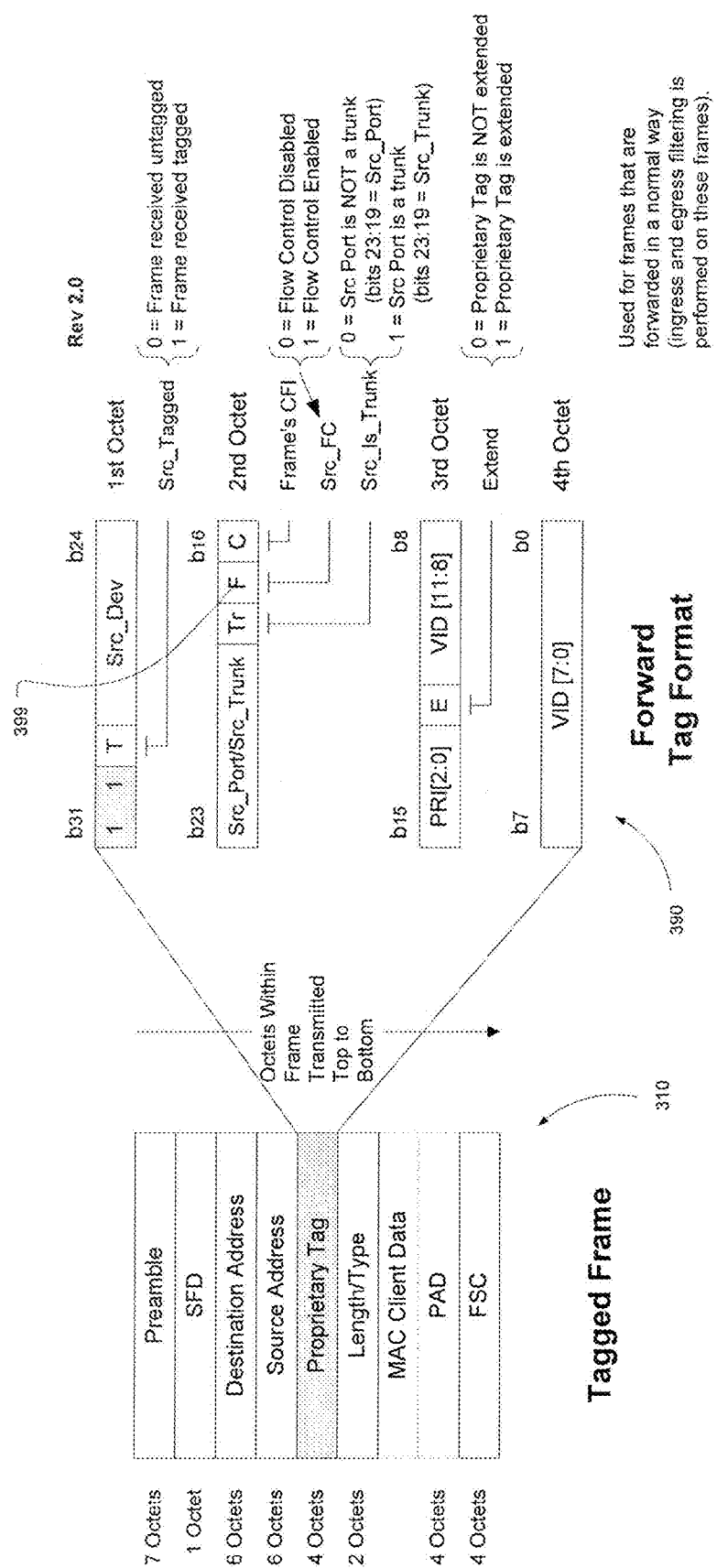
FIG. 3 is a simplified diagram illustrating one embodiment of a frame tag facilitating cross-chip flow control.

In that regard, FIG. 3 is a simplified diagram illustrating one embodiment of a frame tag facilitating cross-chip flow control. A frame tag is generally indicated at reference numeral 310. Tag 310 includes various data fields, including, but not limited to: a preamble; a start-of-frame delimiter (SFD); a destination address; a source address; an EtherType or length type indicator (Length/Type); a MAC client data indicator; an optional data pad that may be required in the event that the size of the frame is smaller than the IEEE 802.3 minimum frames size of 64 bytes (PAD); and a frame sequence check (FSC). Additionally, the exemplary frame tag includes a proprietary DSA Forward Tag 390 that is illustrated as exploded on the right side of FIG. 3.

In accordance with the FIG. 3 embodiment, a bit (reference numeral 399) of DSA Forward Tag 390 is defined to be "Src_FC" (or source flow control). As indicated in FIG. 3, this bit may be set to a 1 when the original source port is configured with flow control enabled. For example, the Src_FC bit 399 may be set to a 1 if the normal network port the frame originally ingressed is configured with flow control enabled; otherwise, this bit is cleared.

Specifically, when ingress receives a DSA Forward frame on a DSA (or EtherType DSA) enabled port, it will send Src_FC bit 399 to the QC as the flow control mode of the ingress port. Conversely, when ingress receives a frame from a normal network port (i.e., not a DSA enabled port), it may send that physical port's flow control mode to the QC instead of Src_FC bit 399; additionally or alternatively, the DSA tag associated with the frame may be modified, and the Src_FC bit 399 may be set for future use, as described above.

In operation, the QC may employ this new information regarding the mode of the ingress port for frame keep/drop & start/stop flow control purposes; in some implementations, the QC will not affect the manner in which a port operates once flow control has been started on the port. For example, it is assumed that all DSA links will have flow control enabled on them. If a DSA port receives a frame with Src_FC bit 399 set, and the frame is being mapped to an egress port with flow control enabled, the frame will be kept. If keeping the frame (i.e., mapping the frame to the egress queue) requires the DSA port to start issuing cross-chip flow control messages or pause frames to its link partner, the appropriate frames will be generated. If the next frame entering the DSA port has Src_FC bit 399 cleared (e.g., the frame was received before the pause frame finished), and it is being mapped to the same port as the previous frame (i.e., the egress port has flow control enabled), then the frame will be discarded since the port is congested. In the foregoing example, the DSA port will continue to issue cross-chip flow control message or pause frames as needed until the source of the congestion stops (i.e., the port remains working as it normally would).

Figure 4:
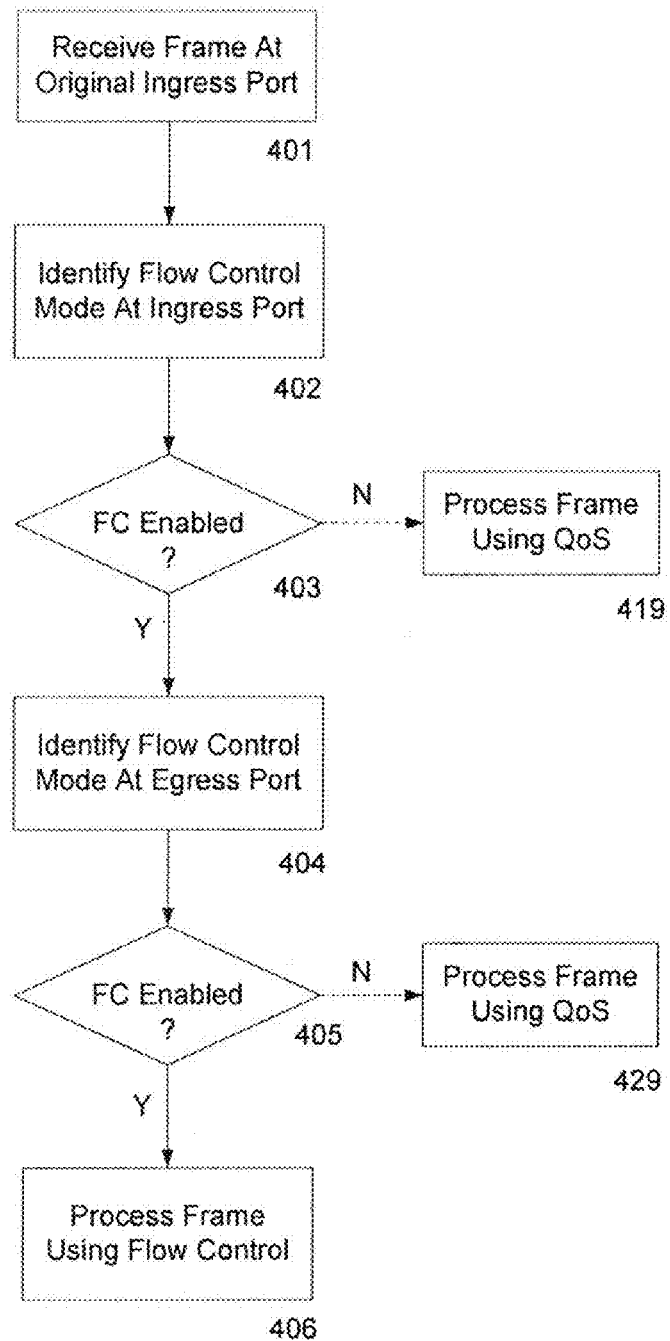
FIG. 4 is a simplified flow diagram illustrating exemplary operation of one embodiment of a method of cross-chip flow control.

FIG. 4 is a simplified flow diagram illustrating exemplary operation of one embodiment of a method of cross-chip flow control. As indicated at block 401, the method may generally begin with receiving a data frame at an ingress port of a switch device. As noted above, the ingress port may be considered an "original" ingress port when it receives data from a source external to the managed switching system incorporating the port.

The flow control mode at the original ingress port may be identified as indicated at block 402. As noted above, a DSA port may set a bit in the frame tag to indicate the port's flow control mode; alternatively, a non-DSA port's mode may be ascertained, for example, from a register setting at the port, from a look-up table, or using other methods generally known in the art. If a determination is made (e.g., at decision block 403) that flow control is not enabled at the original ingress port, then the frame may be processed in accordance with a QoS algorithm as indicated at block 419. As set forth above, flow control modes at intervening ingress ports within the switching system (such as port 121 in FIGS. 1 and 2, for instance) may be ignored.

If flow control is enabled at the original ingress port, then the flow control mode at the egress port to which the frame will be mapped may be determined or identified as indicated at block 404. If a determination is made (e.g., at decision block 405) that flow control is not enabled at the egress port, then the frame may be processed in accordance with a QoS algorithm as indicated at block 429.

When flow control is enabled at both the original ingress port as well as the egress port, the frame may be processed in accordance with a flow control algorithm as executed by the QC, for example. It is noted that the arrangement of the blocks in FIG. 4 does not necessarily imply a particular order or sequence of events, nor is it intended to exclude other possibilities. For example, the operations depicted at 402 and 404, and the determinations made at decision blocks 403 and 405, may occur substantially simultaneously with each other.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of flow control between devices, said method comprising:
    identifying a first flow control mode at an original ingress port receiving a frame, wherein said identifying the first flow control mode comprises reading a register setting at the original ingress port or reading a value in a look-up table;
    identifying a second flow control mode at an egress port to which the frame is mapped; and
    applying a quality of service algorithm either when flow control at the original ingress port is disabled or when flow control at the egress port is disabled.

2. The method of claim 1 wherein said identifying the first flow control mode at the original ingress port comprises reading a value of a bit in a frame tag.

3. The method of claim 2 wherein said identifying the first flow control mode at the original ingress port further comprises reading a value of a flow control bit in a distributed switching architecture (DSA) Forward tag.

4. The method of claim 1 wherein the frame is a data frame.

5. A method of flow control between devices; said method comprising:

receiving a frame at an original ingress port at a first switch;

identifying a first flow control mode at the original ingress port;

mapping the frame to an egress port at a second switch;

identifying a second flow control mode at the egress port; and applying a quality of service algorithm or a flow control algorithm for the frame at the egress port based on considering both the first flow control mode at the original ingress port and the second flow control mode at the egress port.

6. The method of claim 5 wherein said identifying the first flow control mode at the original ingress port comprises reading a register setting at the original ingress port.

7. The method of claim 5 wherein said identifying the first flow control mode at the original ingress port comprises reading a value in a look-up table.

8. The method of claim 5 wherein said identifying the first flow control mode at the original ingress port comprises reading a value of a bit in a frame tag.

9. The method of claim 8 wherein said identifying the flow control mode at the original ingress port further comprises reading a value of a flow control bit in a distributed switching architecture (DSA) Forward tag.

10. The method of claim 5 wherein the frame is a data frame.

11. A flow control system comprising:

a first switch to receive a frame at an original ingress port;

a second switch to map the frame to an egress port; and a queue controller to apply a quality of service algorithm either when a first flow control mode at said original ingress port is disabled or when a second flow control mode at said egress port is disabled;

wherein said first switch is configured to read a register setting or read a value in a look-up table to identify the first flow control mode.

12. The system of claim 11 wherein said first switch reads a value of a bit in a frame tag to identify the first flow control mode at said original ingress port.

13. The system of claim 11 wherein said first switch reads a value of a flow control bit in a distributed switching architecture (DSA) Forward tag.

14. The system of claim 11 wherein the frame is a data frame.

* * * * *